March 29, 1966 B. F. HART ETAL 3,243,623
ELECTRIC MOTOR EDGEWISE WOUND HELICAL CORE
Original Filed Jan. 2, 1962 3 Sheets-Sheet 1
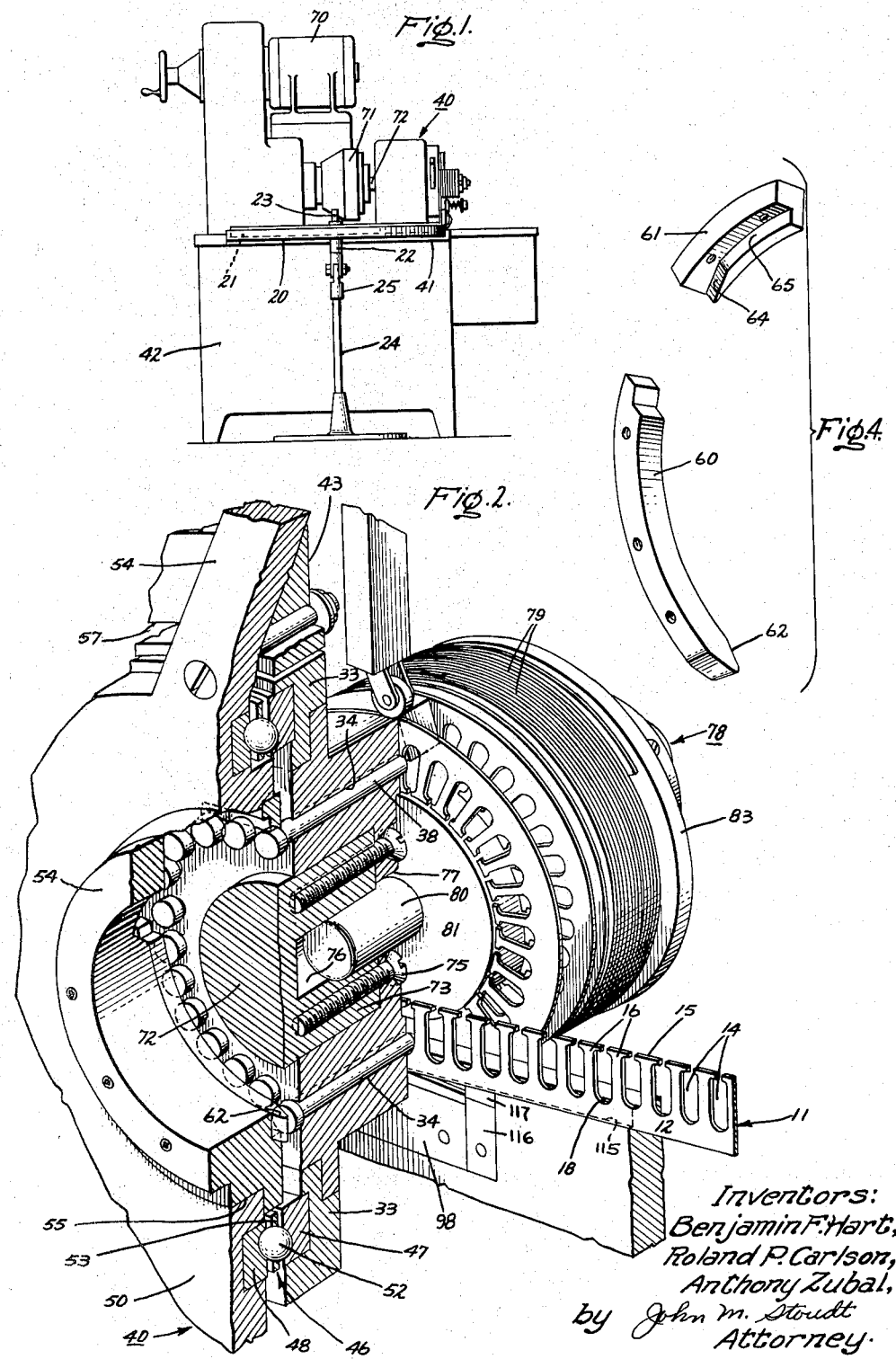
Inventors:
Benjamin F. Hart,
Roland P. Carlson,
Anthony Zubal,
by John M. Stoudt
Attorney.

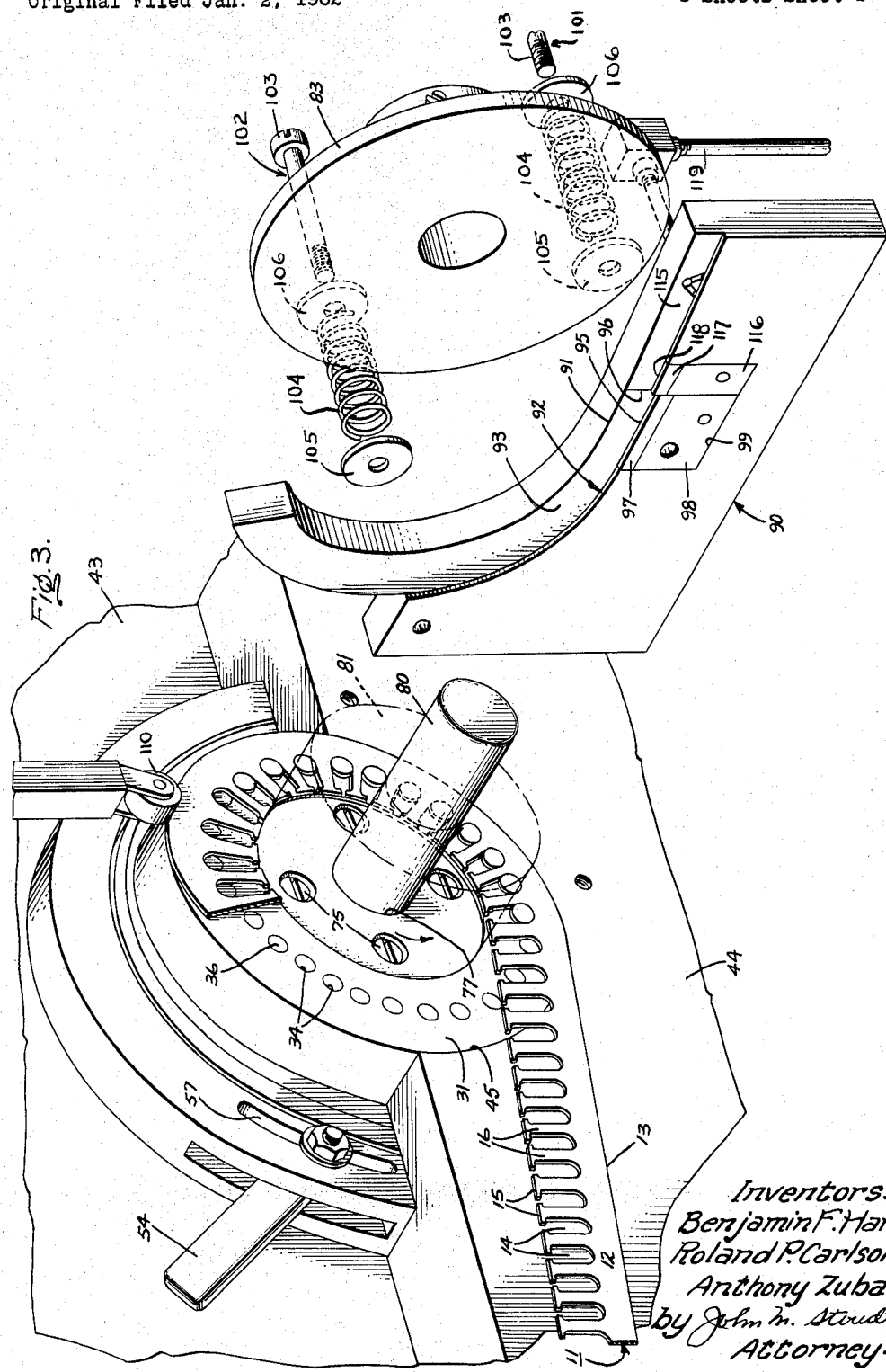

March 29, 1966  B. F. HART ETAL  3,243,623
ELECTRIC MOTOR EDGEWISE WOUND HELICAL CORE
Original Filed Jan. 2, 1962  3 Sheets-Sheet 3

Inventors:
Benjamin F. Hart,
Roland P. Carlson,
Anthony Zubal,
by John M. Stoudt
Attorney.

United States Patent Office 3,243,623
Patented Mar. 29, 1966

3,243,623
ELECTRIC MOTOR EDGEWISE WOUND
HELICAL CORE
Benjamin F. Hart, Ballston Lake, Roland P. Carlson, Schenectady, and Anthony Zubal, Latham, N.Y., assignors to General Electric Company, a corporation of New York
Original application Jan. 2, 1962, Ser. No. 163,608, now Patent No. 3,206,964, dated Sept. 21, 1965. Divided and this application Apr. 6, 1965, Ser. No. 445,990
3 Claims. (Cl. 310—216)

This invention relates generally to an improved helically wound elongated strip of magnetic material, and more particularly to an improved edgewise wound magnetic core structure formed from a continuous, relatively thin, perforated metal strip suitable for use as a core structure in the construction of electric motors. This application is a division of our co-pending application Serial No. 163,608, filed January 2, 1962, now Patent No. 3,206,964 granted September 21, 1965.

Dynamoelectric machines, especially small horsepower induction electric motors, conventionally incorporate rotor and stator cores formed of a plurality of individual generally disc-shaped laminations. In the manufacture of these cores, it is common practice to stamp out the laminations from relatively thin magnetic sheet material, such as for example, the well-known continuously cold rolled low carbon electrical sheet steels having thicknesses in the order of 0.010 to 0.030 inch. With specific reference to the formation of stator laminations, customarily, the punching operation produces a lamination of annular configuration provided with a suitable rotor receiving bore and spaced apart slots and teeth in communication with the bore. A predetermined number of laminations are then stacked in juxtaposed relation to form a stack with aligned slots for accommodating an electrical winding and the stack is placed under compression while some form of fastening means, e.g. transverse welds across the periphery of the stack, is utilized to secure the laminations together into a unitary core structure. Although the electrical characteristics of this type of core are highly desirable, the fabrication process entails, among other things, an excessive waste of magnetic material, especially between adjacent laminations, resulting in relatively high manufacturing costs.

Thus, in an effort to reduce the waste of material and ultimate cost of producing stator cores, it has been suggested that the cores be constructed from a continuous strip of material which is initially performed at equal intervals on one edge of the strip to provide the requisite winding slots. The strip is then edge wound into a cylindrical helix with the slots axially aligned to provide a complete stator structure from a single strip of material. However, prior to the present invention, the methods proposed to manufacture edge wound stator cores and the suggested apparatus have limited the quality of the resulting helically wound core. For instance, in one approach, a continuous length of strip material having a plurality of slots provided on its edge is fed between a pair of tapered rollers which exert pressure on the solid portion of the strip, stretching its periphery and giving it an arcuate form. The method and apparatus as disclosed in the Carlson Patent No. 1,920,154 and other subsequently granted patents are typical of this procedure. Unfortunately, cores manufactured in this manner have not been entirely satisfactory. For instance, the pressures exerted by the rollers are not always sufficiently uniform, and in addition, the type of bending involved, while shaping the material into a helical form, stretches the material irregularly in response to the pressure applied to produce a helix having turns with an irregular or wavy surface and non-uniform thickness. This, of course, adversely affects the electrical characteristics of the core and ultimate performance of the motor. Further, quite frequently the strip is wound such that the slots and teeth of the material are misaligned with the teeth being non-radial; consequently the core is unsuitable for use as a motor stator.

In an effort to overcome these objections, especially in the use of a high grade of hardened magnetic material which resists bending, such as commercially available mill annealed electrical silicon steel, the material was further annealed to obtain the lowest possible yield point prior to the winding process. However, with this additional annealing step, the material becomes exceedingly sensitive to any bending operation or applied pressure and the strip may still be stretched in an irregular fashion with the resulting undesirable affects mentioned heretofore for cores wound with cold rolled low carbon material.

Consequently, in spite of the obvious savings in material effected in the forming of cores by the edgewise winding manufacturing techniques; e.g. as high as 25% compared to the processes which produce individual laminations in the manner discussed above for the reasons previously outlined above, edgewise winding has not been extensively employed by motor manufacturers who still prefer to form stator cores from a plurality of juxtaposed laminations. This is especially true for those applications which require the use of cores, formed with radially extending teeth in axial register, having excellent electrical characteristics and capable of performance favorably comparable to cores formed from a stack of stamped out laminations.

Accordingly, it is the primary object of the present invention to provide an improved yet inexpensive helically wound core of magnetic strip material wound edgewise, for use in an electrical device which for a given size is capable of approximating the performance of a core formed from a stack of laminations.

It is another object of the present invention to provide an improved helically wound stator core formed of a number of turns of magnetic strip material, wound edgewise into a helix having angularly spaced apart slots and teeth in axial register, joined together by a yoke section, which is capable of approximating or even improving the performance of and has similar electrical characteristics to a more expensive stator core of the same size and over-all shape, fabricated from a stack of individual laminations.

In carrying out the objects of this invention in one form, we provide an improved helically wound core, such as a stator core, defined by a number of superposed helical turns formed from an elongated relatively thin strip of magnetic sheet material wound edgewise. The material initially has a solid portion of preselected transverse width and spaced apart notches adjacent one edge thereof to define generally parallel and spaced projections integrally joined to the solid portion. The projections and notches in the wound core are arranged in axial register to provide respectively a number of angularly spaced apart teeth sections and slots for accommodating windings, with the solid portion defining a flux carrying yoke section directly outwardly of the slots which is at least 4% dimensionally less in radial width in the direction of the core axis than the preselected transverse width of the corresponding solid portion of the strip, and for best results preferably 10%, based upon the radial width of the formed yoke section. In addition, the radial dimensions of the individual teeth sections remain substantially constant when compared to the respective projections in the uniformed strip from which they originate. With this construction, the helical or edgewise wound core of our invention is not only economical to produce with yoke and teeth sections of generally uniform thickness, but in addition, it has electrical and potential output or performance characteristics which compare quite favorably with the more expensive core of similar size and shape fabricated from a stack of punchings or laminations.

The subject matter which we regard as our invention is particularly pointed out and distinctly claimed in the concluding portion of this specification. Our invention, itself, however, both as to its organization and method of operation, together with further objects and advantages thereof, may best be understood by reference to the following description taken in connection with the accompanying drawings.

In the drawings:

FIGURE 1 is a side elevational view of the helical winding apparatus which may be employed to wind one form of our improved edgewise wound magnetic core structure;

FIGURE 2 is a perspective view in section of a part of the apparatus of FIGURE 1 to illustrate detail;

FIGURE 3 is an exploded view in perspective of the principal component parts of the apparatus of FIGURE 1;

FIGURE 4 is a view in perspective of the cam structure employed to actuate the pins shown in FIGURE 2.

Figure 5:
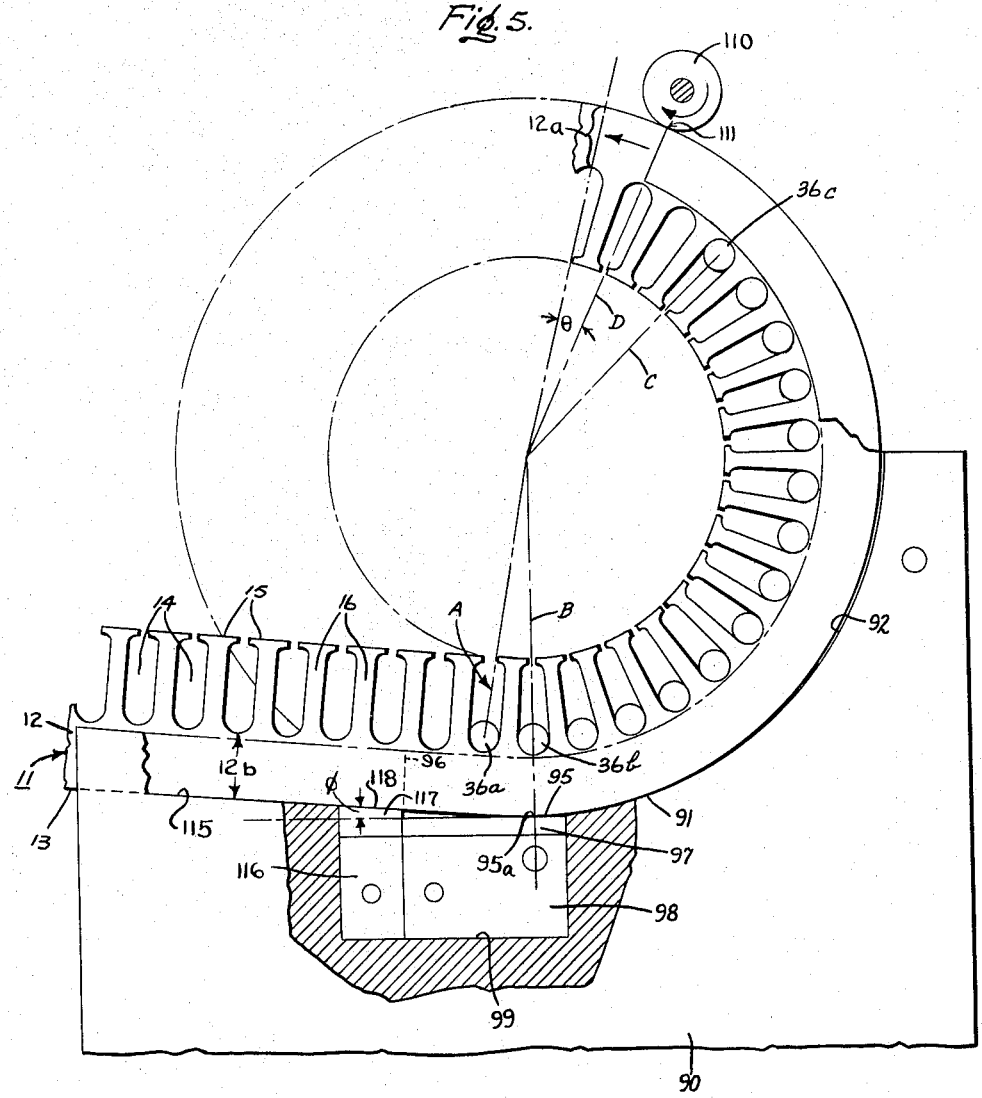
FIGURE 5 is a fragmentary view of the manner in which the slotted strip of material is driven and formed into the preferred embodiment of the helically wound core of our invention by the apparatus of FIGURE 1.

Referring to the drawings in more detail, for purposes of illustration we have shown the preferred embodiment of our invention employed in connection with a helically wound motor stator core formed by the apparatus generally indicated by numeral 10. In this exemplification, a long continuous elongated strip 11, composed of magnetic material of uniform thickness, such as commercially available semiprocessed silicon steel, is utilized as the unformed stock material. Preparatory to its formation into a helix, strip 11 (FIGURES 2, 3, and 4) includes a solid yoke portion or section 12, having an imperforate straight outer edge 13, and a plurality of equally spaced apart transverse notches or slots 14 of the desired configuration, extending from the inner edge 15 of the material to solid section 12 forming a plurality of equally spaced apart identical teeth sections 16 in substantially parallel relation along edge 15 of strip 11. It will be seen from the various drawings that the sides of the teeth are generally parallel, terminating in a bottom slot edge 18 of arcuate configuration. It should be recognized, of course, that the exact shape and size of the teeth and of the slots will depend upon the requirements for the finished core and that the configuration shown is by way of explanation only.

With specific reference to FIGURE 1, a suitable length of strip 11 to be helically wound into a finished stator core is shown being fed to apparatus 10 from a freely rotatable drum 20, which carries the strip in a rolled form indicated at 21. Preferably strip 11 should be of sufficient length to form several helical cores of the desired axial length. Drum 20 is attached to a central sleeve 22 which is removably journaled on stud 23, in turn, connected to upright stand assembly 24. The illustrated connection is of the conventional swivel type 25, capable of clamping and holding stud 23, and consequently strip supporting drum 20, at the desired angle for continuously feeding strip 11 from roll 21 to apparatus 10.

The preferred arrangement and cooperative relation of elements for carrying out the important bending and helical winding operation are most clearly shown in FIGURES 2 and 3. In particular, apparatus 10 includes a rotatable head assembly 30 having a generally cylindrical head 31 having a flat end face or working surface 32, which is arranged substantially perpendicular to the axis of rotation of member 31, and an annular flanged section 33 provided at the other end of the head. A plurality of angularly and equally spaced apart holes 34, arranged in a circle concentric with the axis of rotation of assembly 30, are provided axially through head 31 and communicates with but inwardly of working face 32. Preferably, the angular distance between each hole corresponds with that between adjacent slots in the formed helix. An indexing pin 36 is reciprocably mounted in each hole and comprises an enlarged head portion 37 and shank portion 38, with the shank portion being accommodated by the hole.

Any suitable means may be employed to rotatably support head asembly 30 in apparatus 10. By way of illustration only, the means is shown as comprising a headstock assembly 40 attached to a horizontal platform 41 (FIGURE 1) of apparatus frame 42. As illustrated, headstock 40 includes a stationary housing 43 having a vertical wall 44 provided with an opening 45 for receiving head assembly 30 in spaced or running relation. Head assembly 30 is rotatably mounted to headstock 40 by means of a ball bearing arrangement, generally identified by numeral 46. The bearing includes a first race 47, fastened to annular section 33 of assembly 30, and a second race 48 mounted in a vertical plate 50, disposed behind wall 44. A plurality of balls 52, adapted to rotate in these races, are suitably spaced from one another by means of a spacer member 53. If desired, the plate 50 may be made adjustable with means for securing it in a fixed relation to wall 44. This may be accomplished by providing the plate with an arm 56 projecting through a suitable curved slot 57 radially beyond the housing 43. A nut and bolt may be provided to cooperate with the curved slot 57 for adjustably connecting the plate to wall 44. Plate 50 has a ring-like section 54, attached thereto by an interengaging shoulder construction, indicated by numeral 55, disposed behind pins 36. A pair of cam members 60 and 61 (FIGURES 2 and 4) are respectively mounted to plate 50 and section 54 for imparting reciprocal motion to pins 36 at preselected angular positions (to be explained hereinafter) during rotation of head assembly 30. Cam 60 has an inclined surface 62 at its leading edge for successively engaging pin head 37 to force each pin independently to an extended position in which the extreme end of the pin shank portion 38 projects beyond working face 32 to engage notches 14 of strip 11. On the other hand, inclined surface 64 and channel 65 of cam 61 are employed to return the pins in succession to their retracted positions; i.e., the end of each pin shank 38 being contained within hole 34.

The means for driving head assembly 30 may take any suitable form, and with reference to FIGURES 1 and 2, it will be seen that we have shown this means as an electric motor motive power means 70 connected through a conventional gear reduction and clutch system 71 to shaft 72, which has its end 73 complementary received centrally of head 31, inwardly of section 33 and holes 36. The head is fixedly secured to shaft end 73 by a plurality of screws 75.

Shaft end 73 and head 31 may be furnished with aligned apertures 76 and 77 for removably supporting an arbor 78, which is adapted to carry the helical turns of strip 11 after the strip has been bent and formed into the desired helical configuration, the turns being denoted generally by numeral 79 in FIGURE 2. The arbor, as shown, is designed to rotate with drive shaft 72 and head assembly 30, and includes a unitary central rod 80 and a cylindrical block 81, which has an outer diameter corresponding in dimension to that of the bore of the finished core. Rod 80 is received in shaft aperture 76 and secured to drive shaft 72 as by an interference fit. Head 31 may have a countersunk annular cavity 82 outwardliy of aperture 77 to accommodate one end of block 81. At the other end of the block, a collar and disc member 83 is attached to the rod for confining the wound helical turns. If desired, the circumference of the block may be provided with suitable splines (not illustrated) which fit into one or more of the slots of the helix to maintain the slots in alignment for further fabrication into a completed stator core.

A generally radial compressive force is applied to the yoke section 12 of strip 11 as it is being edgewound to effect a predetermined reduction in the yoke width, while concurrently applying a substantially constant lateral compressive force to the side of the yoke section in the proximity of the radial compressive force. The two compressive forces together compensate for the thinning of the outer portion of the yoke section which would otherwise occur during the bending operation and not only preserve the uniform thickness of strip 11 while forming it into the plurality of helical turns 79, especially from the outer periphery 13 of yoke section 12 to teeth 16, but in addition prevent wrinkles and other objectionable material deformation. For achieving the foregoing to the core of the preferred embodiment, we provide the following arrangement to cooperate with head assembly 30, previously described.

In the illustrated embodiment, best seen in FIGURES 3 and 5, a steel plate 90, mounted contiguous to vertical wall 44 of housing 43 adjacent head assembly 30, is formed on its upper inner edge (as viewed in the drawings) with a groove 91 having arcuate length of approximately 90° and an L-shaped cross section defined by perpendicular walls 92 and 93 for receiving a single thickness of strip material. The walls of groove 91 and working face 32 of head assembly 30 conjointly form a restricted channel through which solid section 12 of strip 11 passes as the strip is driven in an angular path by pins 36. A pressure applying shoulder or surface, indicated by numeral 95, is arranged in the path of strip 11 to engage strip edge 13 adjacent entrance 96 of groove 91 as strip section 12 is driven through the restricted channel. As shown, pressure surface 95 is formed by the outer edge of a case hardened steel section 97 of a block 98, which is retained within a suitable recess 98 provided on plate 90 in communication with groove 91.

FIGURE 5 clearly reveals the preferred manner in which the predetermined radial compression and resulting preselected reduction in width of strip section 12 are achieved by our illustrated arrangement. It will be recalled from the preceding description of head assembly 30 that pins 36 are successively movable between extended positions, in which they are placed in positive engagement with the edge of slots 14, and retracted positions. We prefer to operate the pins into the extended position at some point, identified by the letter A, in their arcuate travel prior to the position, indicated by letter B, in which the pins assume their shortest linear distance from pressure surface 95. The exact angular distance between positions A and B will be determined by the location of cam 60 which urges the pins into driving engagement with the strip.

As the pins move in an arcuate path from position A to position B, they force outer edge 13 of section 12 into compressive engagement with hardened surface 95, effecting a predetermined reduction of that section and causing a thickening of the outer portion of the section where the strip has a tendency to stretch and diminish in thickness during the winding operation. At the same time pins 36 and surface 95 bend the strip into an arcuate shape as determined by the arcuate path of pins 36. Consequently, it is not necessary that wall 93 of groove 91 beyond surface 95 be in engagement with the edge 13 of strip 11 which has already received a substantial set. For best results, the angular distance between positions A and B, that is, between pins 36a and 36b as seen in FIGURE 5, should be approximately 10°.

In addition, we have determined that the reduction in width of section 12 of the strip should be in the neighborhood of 10% (based upon the width of the finished yoke section 12a in FIGURE 5). For example, when forming a helix having a final yoke width of 0.404 inch from material having a 0.025 inch nominal thickness, an initial width, 12b, of 0.444 inch would be preferred. It will be appreciated, of course, that such differences as material composition, hardness, and thickness, among others, will affect the most desirable position at which the pins are urged into driving contact with the strip and the exact reduction in width required for strip section 12, but we have found as a general rule that the reduction should be at least 4%.

Turning now to a consideration of the extent of the driving engagement of pins 36 with strip 11, the position at which the pins are successively retracted by cam 61 in the manner previously described is shown by letter C in FIGURE 5. We prefer to maintain the pins in driving engagement with the strip for an angular distance of 160° or less (positions A–C) since a substantially greater engagement causes interference between the material and the pins and adversely affects the winding operation. Moreover, since the major part of the bending of strip 11 has taken place in the vicinity of surface 95, there is no need for maintaining the pins in driving engagement with the strip for an angular distance greater than 160°.

Concurrent with the radial compression of strip section 12, we provide a substantially constant lateral pressure on the side faces of strip section 12 as it is being driven through the confined channel between groove 91 and working surface 32. This substantial constant lateral pressure not only augments the bending and reduction operations previously described, but in addition, prevents the formation of wrinkles and other material deformation which cannot be smoothed out later.

To achieve this end (see FIGURE 3 in particular), plate 90 is mounted to housing 43 by a pair of coil spring assemblies 101 and 102 with each assembly including a bolt 103 carrying a coil spring 104 between a pair of identical washers 105 and 106. Preferably, one of the assemblies 101, projects through block 98 adjacent pressure applying surface 95, and into a threaded aperture of housing 41. Assembly 102 is disposed a suitable angular distance away from assembly 101 near termination of groove 91. This arrangement mounts wall 93 in parallel spaced relation to working face 32 and urges the wall towards the face with the requisite lateral force.

At this time the variance in thickness of commercially available sheet material out of which unformed strip 11 may be suitably cut into the desired widths and rolled onto drum 20 should be considered. For example, assuming sheet material having a nominal thickness of 0.025 inch (25 mils) is purchased in 15 inch widths for cutting into a plurality of strips, the thickness tolerance is usually plus or minus 3 mils; i.e., 22–28 mils. Consequently, in order to insure a constant lateral pressure on the sides of section 12, the width of wall 92 as well as the width of pressure applying surface 97 extending into groove 91 should be somewhat less than the minimum tolerance of the strip being wound. In the case of the 25 mils example, the width of wall 92 should preferably be dimensionally less than 22 mils.

In some applications, it is critical that the core be provided with an accurately controlled outer diameter within certain dimensional tolerances. For these situations, it is desirable to provide a final diameter shaping action on each helical turn as it emerges from the confined channel of plate 90. One possible means for accomplishing this control is with a roller assembly 110, mounted angularly beyond pin retracting position C to engage the outer edge of the wound strip. Assembly 110 produces a rolling engagement on edge 13, indicated at 111, at position D (FIGURE 5). Thus, assembly 110 bends the strip around pin 36c, while the pin is still contacting strip edge 14, the linear distance between pin 36c and rolling engagement 111 defining the bending moment. It is important that the bending moment be closely controlled; in the formation of a thirty-six slotted helix, for example, we have discovered that rolling engagement 111 should be located approximately two slots beyond pin retracting position C, i.e., about 20° between positions C and D for imparting the proper bending moment around pin 36c. In apparatus employing a final bending mechanism, such as assembly 110, it is desirable to extend wall 93 of plate 90 up to the point of engagement 111 so that the lateral pressure is applied to the curved strip in the vicinity of the final bending or shaping operation.

Means is also provided for insuring the formation of substantially radially projecting teeth in the finished core. More specifically, we feed unformed strip 11 through channel entrance 96 to pressure surface 95 and groove 91 at an angle having a direct relationship to the angle defined between the center lines of adjacent strip slots in the formed helix (angle $\theta$ in FIGURE 5). In the illustrated embodiment, best seen in FIGURE 5, an L-shaped feeding groove 115 is formed on the upper inner edge of plate 90 in communication with entrance 96 for accommodating strip section 12. Groove 115 includes a steel block 116 provided with a case hardened upper section 117 similar to section 95 of block 98. Block 116 is mounted in abutting relation with block 98 in plate recess 99 so that both groove 115 and upper surface 118 of block section 117 cooperate to feed the strip to entrance 96 at an angle $\phi$ which is approximately equal to $\frac{1}{2} \theta$. Angle $\phi$ is measured toward pins 36 from a line drawn tangent to the place of pressure engagement 95a, between surface 95 and strip edge 13, to upper surface 118 and strip edge 13. Thus, for a thirty-six slotted helical core having an angle $\theta$ of 10° taken between the center lines of adjacent slots, the feeding angle $\phi$ should be 5°. With this approximate relationship between angles $\phi$ and $\theta$, we have discovered that the teeth will always be provided in a radial fashion and the chances of misalignment of the teeth and slots are effectively minimized.

If desired, lubricant may be supplied during the bending operation to cool strip 11 and to flush scale and other particles from the apparatus. This may be readily done by a lubricant carrying pipe 119 (FIGURE 3) disposed in communication with feeding groove 115, adjacent entrance 96.

The following example is given to show how the present invention, as outlined above, has been carried out in actual practice. A number of stator cores of the thirty (30) frame size (among others) were helically wound from cold rolled low carbon electrical sheet steel material having a nominal thickness of 25 mils. Strip 11, prior to the winding operation, included a solid section 12 having a width of 0.444 inch.

The strip was fed from rotatable drum 20 through feeding groove 115 and entrance 96 to the groove 91 at a feeding angle $\phi$ of 5° to the confined channel where the strip was formed into a helix in the manner already described. Helical turns 79 were then taken from mandrel 78, placed in axial compression and suitably secured together; e.g. welded, to form a finished core having the following nominal dimensions:

| | |
|---|---|
| Stack length _____ inches__ | 1.375 |
| Yoke width of the individual turns _____ do____ | 0.404 |
| Number of slots _____ | 36 |
| Rotor receiving bore diameter _____ inches__ | 3.124 |
| Outer peripheral diameter _____ do____ | 5.478 |

These cores were then assembled with rotor members in the usual way to form motors, electrically tested, and compared with a number of motors having standard stator cores fabricated from a plurality of stamped-out laminations composed of the same material and having the same dimensions and overall configuration (e.g., number and shape of teeth). Both type of cores included identical winding arrangements and used the same rotor member and air gap size for the tests.

The following table is a partial tabulation of the typical performance or operating characteristics exhibited by each type of core.

| Performance | Helically Wound Core | Standard Core |
|---|---|---|
| Full Load Speed (r.p.m.) | 1,733 | 1,731 |
| Full Load Watts | 215 | 207 |
| Maximum (breakdown) Torque (oz. ft.) | 20.95 | 20.97 |
| Locked Rotor Watts | 2,210 | 2,151 |
| Locked Rotor Torque (oz. ft.) | 18.90 | 18.96 |
| No Load Speed (r.p.m.) | 1,793 | 1,7933 |
| No Load Watts | 70 | 65 |

From the foregoing table, it will be seen that a motor employing a helically wound stator constructed in accordance with our invention favorably compares in operating characteristics with a motor of equivalent size incorporating a standard stator utilizing a stack of punched out laminations. Moreover, since for many applications, e.g., to drive fans for oil burners, motors of the size under consideration require a minimum breakdown torque of 18 oz. ft. and a locked rotor torque of 15.1 oz. ft., the operating characteristics of the helically wound core of our invention are more than adequate.

Consequently, inexpensive cores incorporating our invention compare favorably in electrical characteristics with the standard laminated punched out type and may be employed even for those applications requiring excellence of performance where, prior to our invention, only the standard laminated cores could be satisfactorily utilized.

It should be apparent to those skilled in the art, while we have shown and described what at present is considered to be the preferred embodiment of our invention in accordance with the Patent Statutes, changes may be made in the structure disclosed without actually departing from the true spirit and scope of this invention, and we therefore intend to cover in the following claims all such equivalent variations as fall within the invention.

What we claim as new and desire to secure by Letters Patent of the United States is:

1. A helically wound stator core member comprising superposed helical turns substantially uniform in thickness formed edgewise into a helix from an elongated relatively thin strip of magnetic sheet material; said strip including a solid portion having a preselected transverse width and a plurality of spaced apart notches provided along one edge thereof defining equally spaced apart, generally parallel projections integrally joined to said solid portion; said projections and notches being in axial register in said wound core member to form respectively a number of angularly and equally spaced apart teeth sections and slots, with said solid portion defining a flux carrying yoke section disposed radially outwardly of said teeth sections, the yoke section of the individual turns radially outward from said slots being at least 4% dimensionally less in radial width in the direction of the core axis than the preselected transverse width of the corresponding strip solid portion, based upon the formed yoke radial width, and the dimensions of the individual teeth sections being generally the same as their corresponding projections in the unformed strip whereby said helically wound stator core includes both teeth and yoke sections of generally uniform thickness and has the desired electrical and performance characteristics.

2. An edgewise wound core member comprising superposed helical turns substantially uniform in thickness formed from an elongated relatively thin strip of magnetic sheet material; said strip including a solid portion having a preselected transverse width and a plurality of spaced apart notches provided along one edge thereof defining spaced apart, generally parallel, projections integrally joined to said solid portion; said projections and notches being in axial register in said wound core member to form respectively a number of angularly spaced apart teeth sections and slots, with said solid portion defining a flux carrying yoke section, said yoke section of the individual turns being dimensionally less by at least 4% in radial width than the preselected transverse width of the solid portion of said strip, based upon the radial width of the formed yoke section, to produce and insure a yoke section of generally uniform thickness.

3. An edgewise wound core member comprising superposed helical turns substantially uniform in thickness formed from an elongated relatively thin strip of magnetic sheet material; said strip including a solid portion having a preselected transverse initial width and a plurality of spaced apart notches provided along one edge of the strip adjacent said solid portion defining spaced apart, generally parallel, projections integrally joined to said solid portion; said projections and notches being in axial register in said wound core member to form respectively a number of angularly spaced apart teeth sections and slots, with said solid portion defining a flux carrying yoke section, the radial width of said yoke section of the individual turns being dimensionally less than approximately 10% of the preselected transverse initial width of said strip solid portion, based upon the radial width of the formed yoke section, and the dimensions of the individual teeth sections being substantially the same as their corresponding projections in the unformed strip whereby said edgewise wound core is capable of producing electrical and performance characteristics comparable to those of a laminated core of the same size and general shape formed of a stack of individual laminations.

References Cited by the Examiner
UNITED STATES PATENTS

| | | | |
|---|---|---|---|
| 2,247,890 | 7/1941 | Reardon | 310—216 |
| 2,845,555 | 7/1958 | Carpenter et al. | 310—216 |

ORIS L. RADER, *Primary Examiner.*

D. F. DUGGAN, *Assistant Examiner.*